United States Patent [19]
Nikl et al.

[11] Patent Number: 5,211,073
[45] Date of Patent: May 18, 1993

[54] APPARATUS FOR GENERATING A PREFERABLY CONTROLLABLE AXIAL COUNTERFORCE IN A ROTATING SHAFT THAT IS AXIALLY DISPLACEABLE BY AN AXIAL FORCE

[75] Inventors: Horst Nikl, Wolfsburg; Alfons Weissbrich, Gauting, both of Fed. Rep. of Germany

[73] Assignee: Volkswagen AG, Fed. Rep. of Germany

[21] Appl. No.: 635,178
[22] PCT Filed: Jul. 3, 1989
[86] PCT No.: PCT/EP89/00755
   § 371 Date: Jan. 2, 1991
   § 102(e) Date: Jan. 2, 1991
[87] PCT Pub. No.: WO90/00130
   PCT Pub. Date: Jan. 11, 1990

[30] Foreign Application Priority Data
Jul. 1, 1988 [DE] Fed. Rep. of Germany ....... 3822219

[51] Int. Cl.$^5$ .................. G05G 5/06; F16C 33/58
[52] U.S. Cl. .................................. 74/527; 74/531; 384/513; 384/906
[58] Field of Search ........... 74/527, 528, 529, 531; 384/512, 513, 906; 192/114 R

[56] References Cited

U.S. PATENT DOCUMENTS

| | | | |
|---|---|---|---|
| 1,623,845 | 4/1927 | Kogstrom | 384/513 X |
| 2,397,164 | 3/1946 | Shafer | 384/906 X |
| 2,455,166 | 11/1948 | Firth | 384/906 |
| 3,543,603 | 12/1970 | Gley | 74/529 |
| 3,623,782 | 11/1971 | Nakanishi | 384/906 |
| 4,606,656 | 8/1986 | LaRou | 384/906 X |
| 4,671,681 | 6/1987 | LaRou | 384/906 X |
| 4,729,674 | 3/1988 | Siebert et al. | 384/906 X |
| 4,749,287 | 6/1988 | Anguera | 384/513 X |
| 4,753,580 | 6/1988 | Ishimoto | 384/906 X |
| 4,983,050 | 1/1991 | Aida | 384/906 X |
| 4,993,851 | 2/1991 | Nakanishi | 384/513 |
| 5,022,770 | 6/1991 | Guasch | 384/513 X |
| 5,069,559 | 12/1991 | Muller et al. | 384/906 |

FOREIGN PATENT DOCUMENTS
895430 1/1945 France .................... 384/513

Primary Examiner—Vinh T. Luong
Attorney, Agent, or Firm—Brumbaugh, Graves, Donohue & Raymond

[57] ABSTRACT

A rotating shaft has a ball bearing axially fixed on the shaft with a recess formed in the outer race. A detent device, urged radially toward the recess, cooperates with inclined flanks on axially opposite sides of the recess to produce a counterforce in response to axial displacement of the shaft without generating significant friction caused by rotation of the shaft. The detent device may have a spherical tip received in a conical or groove-shaped recess or it may be a rotatable roller received in a transversely oriented groove in the outer race.

5 Claims, 3 Drawing Sheets

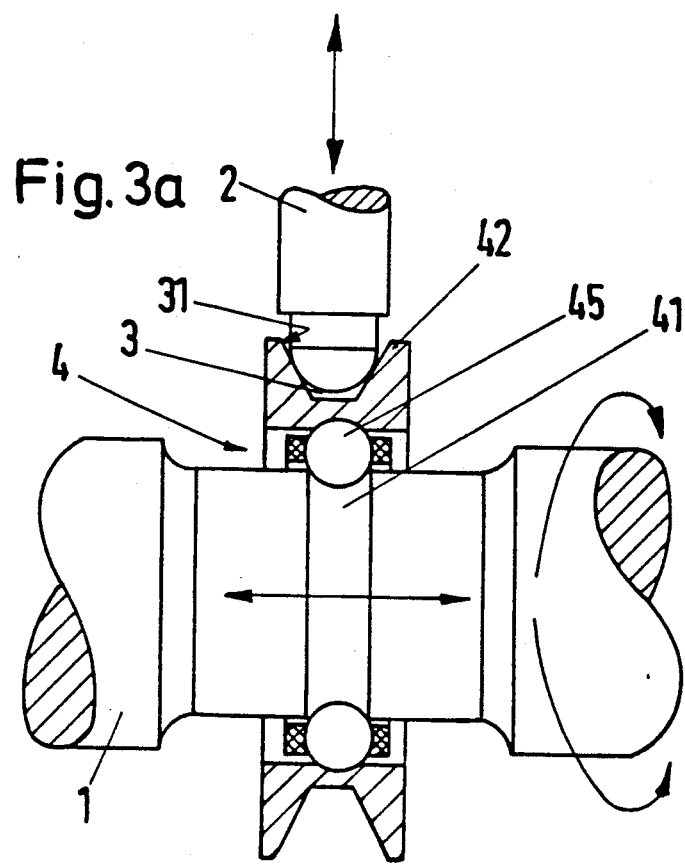
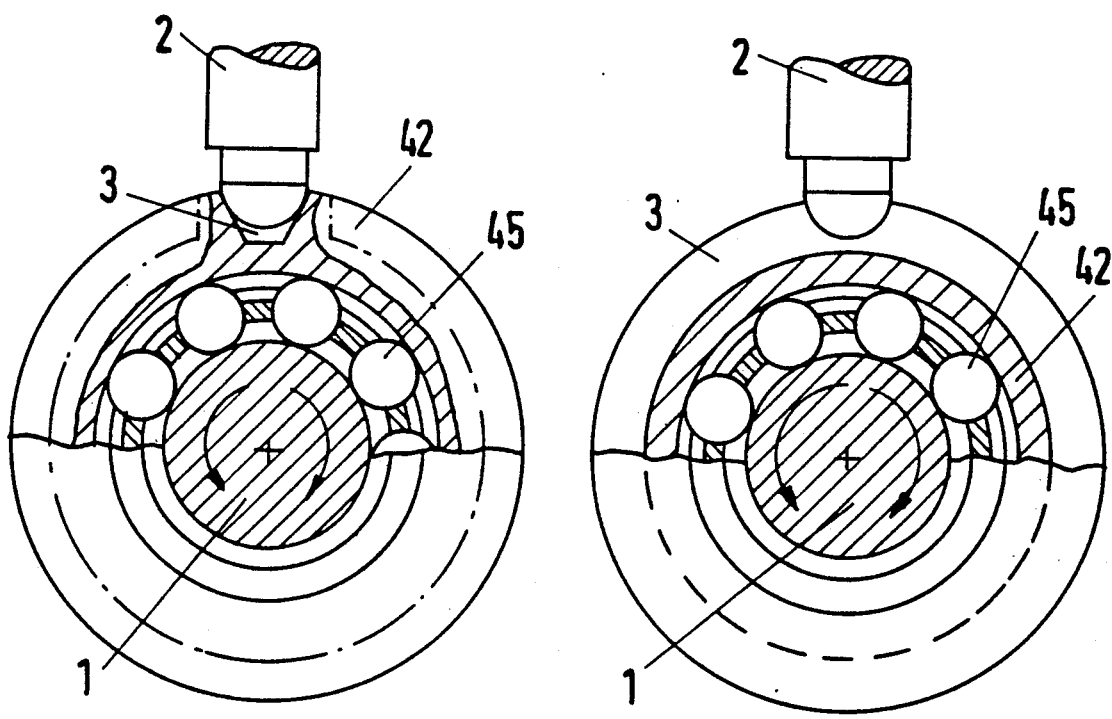

APPARATUS FOR GENERATING A PREFERABLY CONTROLLABLE AXIAL COUNTERFORCE IN A ROTATING SHAFT THAT IS AXIALLY DISPLACEABLE BY AN AXIAL FORCE

BACKGROUND OF THE INVENTION

This invention relates to devices for generating axial forces in rotating shafts and, more particularly, to a device for generating an axial counterforce in a rotating shaft in response to axial displacement thereof.

In electrically powered steering arrangement in motor vehicles, for example, it is important to provide a controllable axial counterforce in response to axial displacement of a rotating shaft. Moreover, arrangements for providing such an axial counterforce to a rotating shaft are useful in many fields of engineering wherever axial counterforces must be applied in opposition to axial forces exerted on a rotating shaft, for example, to generate thresholds for open- or closed-loop control steps to be performed by the shaft.

In the context of fully electric power steering equipment for motor vehicles, an arrangement of this type is known, for instance, from FIG. 5 of German Offenlegungsschrift No. DE-OS 36 12 619. In the apparatus disclosed therein, a detent device in the form of a radially movable control pin urged toward a shaft by a preferably controllable radial force engages a circumferential shaft ring groove having flanks inclined away from the groove bottom. As a result, any axial displacement of the shaft generates an axial force that is dependent, among other factors, on the magnitude of the radial force applied by the pin and o the shape of the groove flanks. This axial force acts in a direction to counter the axial force displacing the shaft.

Because the axial distance along which the detent device can act on the shaft groove for control purposes is short, however, comparatively high radial forces must be applied by the pin.

SUMMARY OF THE INVENTION

Accordingly, it is an object of the present invention to provide an arrangement of generating a counterforce in response to axial displacement of a rotating shaft which overcomes the above-mentioned disadvantages of the prior art.

Another object of the invention is to provide an arrangement of the above type which provides more precise control of the magnitude of the axial counterforce applied to the shaft.

These and other objects of the invention are attained by providing a ball bearing arrangement in axially fixed position with respect to an axially movable shaft and a radial recess in the outer race of the ball bearing arrangement having flanks inclined with respect to the shaft axis, along with a radially movable detent device urged toward the recess. Preferably, the outer race recess is in the form of a groove extending transversely to the shaft axis and the end of the detent device engaging the groove includes a rotatable roller with its axis aligned transversely to the shaft axis.

With the apparatus according to the invention, it is possible to achieve very precisely defined axial counterforces in the rotating shaft which do not change over a very long period of operation because virtually no wear occurs despite comparatively high radial forces applied by the detent device.

In one embodiment, the inner race of the ball bearing arrangement comprises a groove machined directly into the shaft so that the shaft itself serves as the inner bearing race. Preferably, a split outer bearing race is provided in which the parting line is in a plane extending approximately perpendicular to the radial force applied by the detent device and approximately at the position of the shaft axis.

BRIEF DESCRIPTION OF THE DRAWINGS

Further objects and advantages of the invention will be apparent from a reading of the following description in conjunction with the accompanying drawings in which:

FIG. 1b is a cross-sectional view illustrating the embodiment shown in FIG. 1a;

FIG. 2b is a cross-sectional view of the embodiment of the invention shown in FIG. 2a;

FIG. 3a is a fragmentary side view, partially in longitudinal section, illustrating a further embodiment of the invention;

FIG. 3b is a cross-sectional view of the embodiment of the invention shown in FIG. 3a; and FIG. 3c is a cross-sectional view of a modification of the embodiment of the invention shown in FIGS. 3a and 3b.

DESCRIPTION OF PREFERRED EMBODIMENTS

Figure 1A:
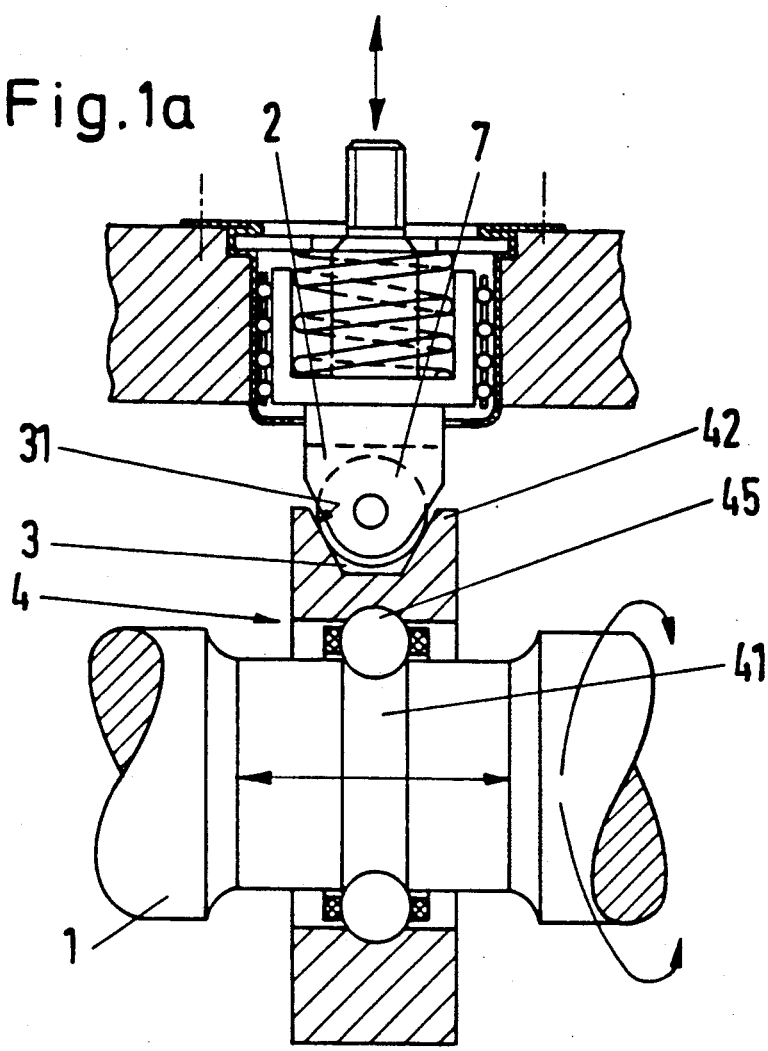
FIG. 1a is a fragmentary side view, partially in longitudinal section, illustrating a representative embodiment of the invention.

In the exemplary embodiments of apparatus for generating an axial counterforce in a rotating shaft illustrated in the drawings, a shaft 1 which is axially displaceable by an axial force cooperates with a radially movable detent device 2 which is urged radially inwardly into engagement with a radial recess 3. The recess 3 is held in axially fixed relation to the shaft 1 and has outwardly inclined sides 31 so that, when the shaft is axially displaced in response to an axial force, the detent device 2 slides radially away from the shaft in opposition to the radial force. As a result, an axial counterforce directed in opposition to the axial force is applied to the shaft.

The axially displaceable rotating shaft 1 may, for example, be the control shaft responsive to the steering shaft of a fully electric power steering system for a motor vehicle, the axial displacement of the control shaft caused by the motion of the steering shaft being effective to disengage a friction coupling that transfers a power-assist force. By control of the apparatus acting through the detent device 2 upon the axially displaceable rotating shaft 1, an influence can be exerted upon the rate of disengagement of these friction couplings, that is, upon the location of the operation on their characteristic curves. The power assist can accordingly be controlled in a simple manner by suitable control of the radial force acting upon the detent device 2 as a function of any of several arbitrary vehicle operating parameters, such as the vehicle load, the speed of the vehicle, transverse and/or longitudinal acceleration, etc. Moreover, this control is highly reliable and precise, since the axial control counterforces in opposition to the shaft-displacing forces can be brought to bear on the axially displaceable rotating shaft 1 very precisely and with little hysteresis.

In accordance with the invention, the detent device 2, which is urged radially inwardly by a controllable force from a force-applying device see FIG. 1a does not, as in the prior art, apply the axial counterforce directly. Instead, the axial counterforce is applied to the axially displaceable rotating shaft 1 through a deep-groove ball bearing arrangement 4 having a plurality of balls 45 and secured in axially fixed position to the shaft 1. As a result, despite the rotational motion of the shaft 1, no significant losses from friction or the like occur, even if comparatively large radial forces are applied to the detent device 2, because only a purely rolling friction is involved, and the radial force is distributed over a plurality of the balls 45.

In the exemplary embodiments shown in all of the drawings, the inner race of the ball bearings 4 is a deep groove 41 machined directly into the shaft 1. Thus, the shaft 1 itself serves as an inner bearing race, providing a very compact structure in the radial direction.

Figure 2A:
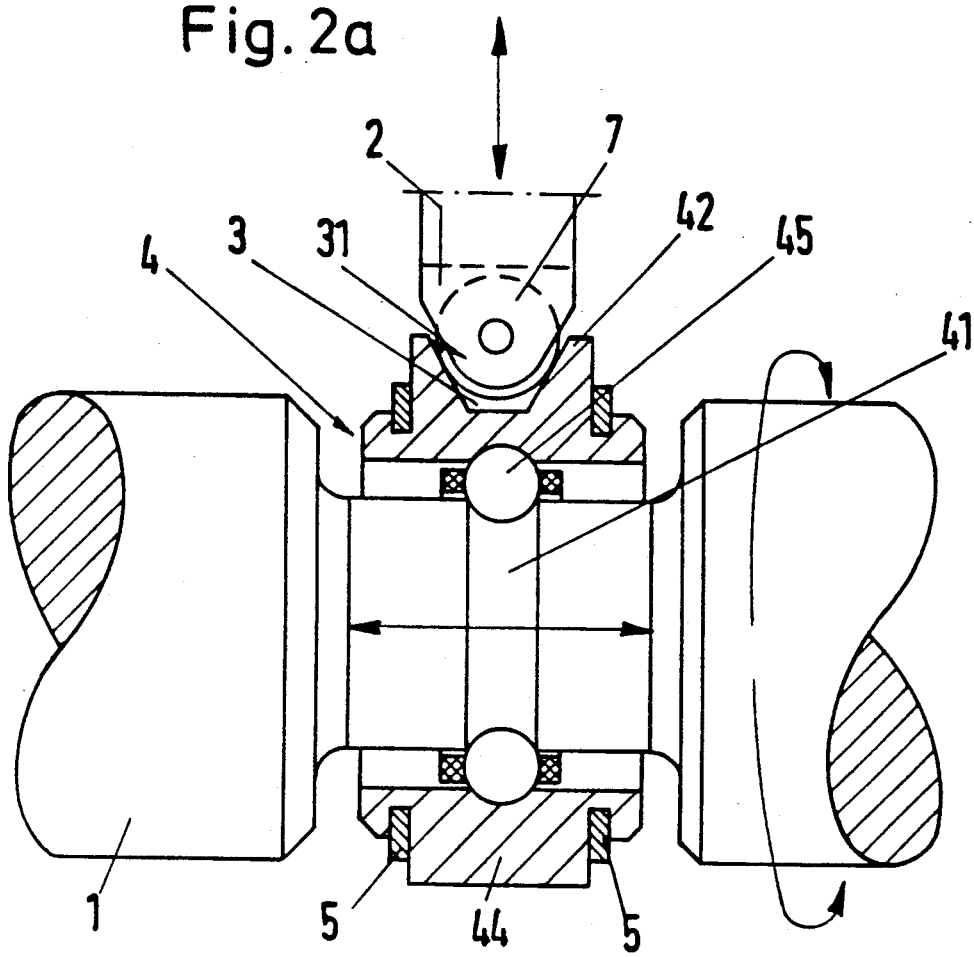
FIG. 2a is a fragmentary side view, partially in longitudinal section, illustrating another typical embodiment of the invention.
Figure 2B:
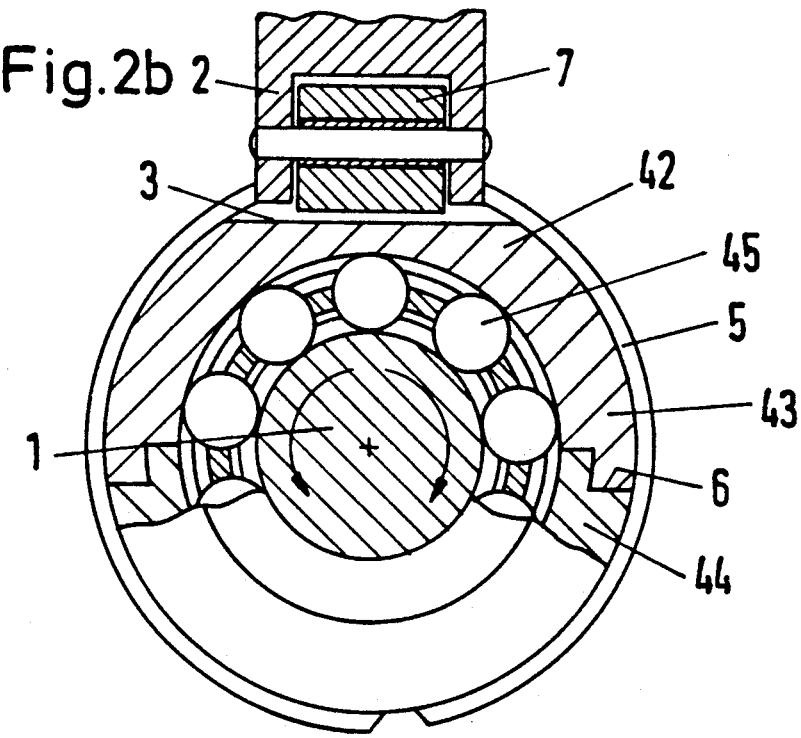

A structure that is even more compact in this respect is attained if the outer bearing race 42 of the deep-groove ball bearing is formed from a split outer ring, as shown in FIGS. 2a and 2b. To permit assembly of the race within the outer diameter of the shaft, the race is made of two parts 43 and 44 held together by two clamping rings 5, which substantially surround the circumference of axially projecting portions of the race parts.

The parting line 6 between the parts 43 and 44 is arranged so that it extends approximately at right angles to the radial force applied by the detent device 2 and is located approximately at the level of the shaft axis. This assures that the radial force applied to the outer bearing race 42 through the detent device 2 does not produce reaction forces tending to spread the two parts 43 and 44 of the race, i.e., forces which would have to be counteracted by the clamping elements 5. Instead, the radial force applied by the detent device 2 is in fact transmitted to the shaft 1 only through the balls 45 located in the upper half, as seen in the drawing, of the ball race which are located above the parting line 6.

By using such a split outer bearing race, the arrangement can be made even more compact in terms of its radial dimensions, since the inside diameter of the outer bearing race 42 can be smaller than the actual shaft diameter.

Figure 1B:
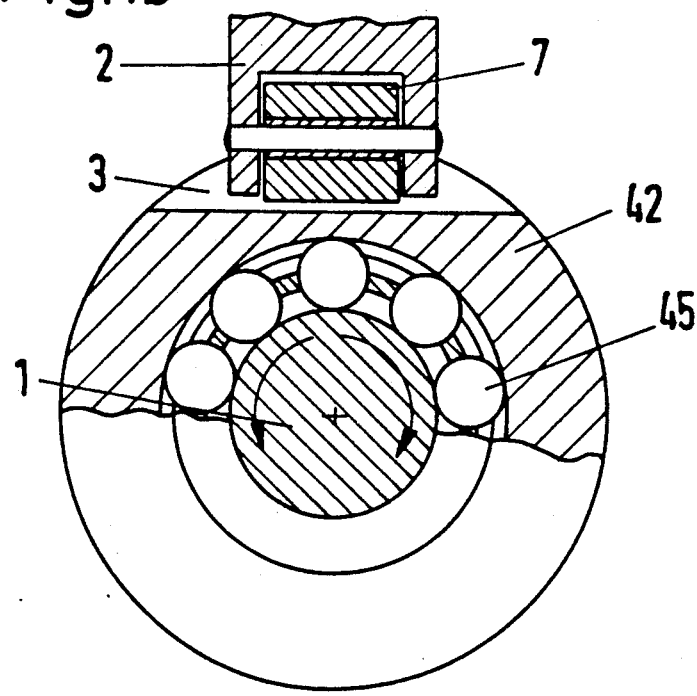

The aforementioned radial recess 3, which is axially fixed with the shaft 1 and is engaged by the detent device 2, is formed in the outer bearing race 42. Because the recess 3 has inclined sides 31, the radial force applied by the detent device is converted into an axial control force counteracting the axial force tending to cause axial displacement of the circling annular groove, as shown in FIG. 3c, or as a transverse groove tangent to only part of the circumference of the outer bearing race, as shown in FIG. 1b, or in the form of a conical bore, as shown in FIG. 3b.

With respect to avoiding friction resulting from the rotational motion of the shaft 1, all of these variants are of equal value, because none of them exerts any influence whatever on the losses due to friction and the like.

In the exemplary embodiments of FIGS. 3a-3c, the free end of the detent device 2 which engages the radial recess 3, whether formed as a conical bore or as a shaft-encircling annular groove, is spherically rounded, as in the prior art. During the axial displacement motion of the shaft 1, a certain static friction that must be overcome first occurs between one of the inclined sides 31 of the radial indentation 3 and the radially highly slippery spherical surface of the free end of the detent device 2 and thereafter sliding friction occurs between those components.

Better and more precise results can be obtained if as in the exemplary embodiments of FIGS. 1 and 2, a roller 7 having an axis transverse to the shaft axis is mounted on the free end of the detent device 2 to engage the recess 3 in the outer bearing race 42. In this case, the recess must be in the form of a groove extending transversely to the shaft axis. In this embodiment, the friction that occurs upon an axial displacement motion of the shaft 1 between the detent device 2 and the inclined side 31 of the recess 3 with which it cooperates is reduced to purely rolling friction. Another advantageous feature of this arrangement is that the resultant surface pressure between the roller body 7 and the groove side 31 remains comparatively slight even with a comparatively large radial force because there is linear contact between the roller body 7 and the groove side 31.

Although the invention has been described herein with reference to specific embodiments, many modifications and variations therein will readily occur to those skilled in the art. Accordingly, all such variations and modifications are included within the intended scope of the invention.

We claim:

1. Apparatus for generating an axial counterforce in a shaft supported for rotation and axial displacement with respect to the location of a detent means comprising a shaft having an axis and being supported for rotation and for axial displacement, ball bearing means comprising a plurality of balls, inner race means fixed in position on the shaft, and outer race means retained by the plurality of balls in axially fixed position with respect to the shaft, recess means in the outer race means having sides which are inclined outwardly with respect to the axis of the shaft, detent means engaging the inclined sides of the recess means and supported for radial motion with respect to the shaft and in fixed position in the axial direction of the shaft, and force-applying means for urging the detent means toward the recess means.

2. Apparatus according to claim 1 wherein the detent means has a spherically rounded end received in the recess means.

3. Apparatus according to claim 1 wherein the recess means is a groove extending transversely to the shaft axis and the detent means includes a rotatable roller body having its axis extending transversely to the axis of the shaft and engaged in the groove.

4. Apparatus according to claim 1 wherein the inner race means comprises a circumferential groove formed in the body of the shaft.

5. Apparatus according to claim 1 wherein the outer race means comprises two parts having a parting line extending approximately at the location of the shaft axis and in a plane approximately at right angles to the force applied by the detent means, and clamping means substantially circumferentially surrounding portions of the two parts of the outer race means to retain them together.

* * * * *

UNITED STATES PATENT AND TRADEMARK OFFICE
CERTIFICATE OF CORRECTION

PATENT NO. : 5,211,073
DATED : May 18, 1993
INVENTOR(S) : Nikl et al.

It is certified that error appears in the above-identified patent and that said Letters Patent is hereby corrected as shown below:

Column 1, line 12, "arrangement" should read --arrangements--;

Column 1, line 33, "o the" should read --on the--;

Column 3, line 5, "see FIG. 1a" should read --(see FIG. 1a)--;

Column 3, line 55, "the circling" should read --the shaft 1. The recess 3 may be formed either as a shaft-encircling--.

Signed and Sealed this

First Day of February, 1994

Attest:

BRUCE LEHMAN

Attesting Officer

Commissioner of Patents and Trademarks